(12) United States Patent
Zhang (10) Patent No.: US 9,467,731 B2
(45) Date of Patent: Oct. 11, 2016

(54) METHOD FOR CONTROLLING TOUCH SCREEN, AND MOBILE TERMINAL

(75) Inventor: Yongliang Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/388,852

(22) PCT Filed: May 9, 2012

(86) PCT No.: PCT/CN2012/075239
§ 371 (c)(1),
(2), (4) Date: Sep. 29, 2014

(87) PCT Pub. No.: WO2013/143205
PCT Pub. Date: Oct. 3, 2013

(65) Prior Publication Data
US 2015/0046945 A1    Feb. 12, 2015

(30) Foreign Application Priority Data

Mar. 30, 2012  (CN) .......................... 2012 1 0089623

(51) Int. Cl.
H04N 5/445        (2011.01)
G09G 5/00         (2006.01)
(Continued)

(52) U.S. Cl.
CPC .... H04N 21/42224 (2013.01); G06F 3/04886 (2013.01); G06F 3/1462 (2013.01); H04M 1/72519 (2013.01); H04M 1/72527 (2013.01); H04N 21/4222 (2013.01); H04N 21/42207 (2013.01); H04N 21/42208 (2013.01); H04N 21/42221 (2013.01); H04N 21/43635 (2013.01); G06F 2203/04803 (2013.01);
(Continued)

(58) Field of Classification Search
CPC ............... H04N 21/42224; H04N 2005/4408; H04N 2005/443
USPC ..................... 725/37; 345/173, 2.2
See application file for complete search history.

(56) References Cited

U.S. PATENT DOCUMENTS 5,818,425 A  *  10/1998  Want ..................... G06F 1/1626
                                                      345/158
7,987,491 B2 *  7/2011  Reisman ........... G06F 17/30873
                                                      725/112

(Continued)

FOREIGN PATENT DOCUMENTS

CN        201812274 U       4/2011
CN        102148945 A       8/2011

(Continued)

OTHER PUBLICATIONS

International Search Report for PCT/CN2012/075239 dated Dec. 13, 2012.

*Primary Examiner* — James R Sheleheda
(74) *Attorney, Agent, or Firm* — Ling Wu; Stephen Yang; Ling and Yang Intellectual Property (57) ABSTRACT

A method for controlling touch screens and a mobile terminal are disclosed. The method includes: a mobile terminal, connected with an HDMI device, requesting the HDMI device for obtaining a right of controlling a touch screen of the HDMI device; and after receiving a permission response message of the HDMI device, the mobile terminal performing a control operation on the touch screen of the HDMI device.

19 Claims, 4 Drawing Sheets

(51) Int. Cl.
*H04N 21/422* (2011.01)
*H04M 1/725* (2006.01)
*H04N 21/4363* (2011.01)
*G06F 3/14* (2006.01)
*G06F 3/0488* (2013.01)
*H04N 5/44* (2011.01)

(52) U.S. Cl.
CPC ... *G09G 2370/047* (2013.01); *G09G 2370/12* (2013.01); *H04M 2250/16* (2013.01); *H04M 2250/22* (2013.01); *H04N 2005/443* (2013.01); *H04N 2005/4408* (2013.01)

(56) References Cited

U.S. PATENT DOCUMENTS

| | | | |
|---|---|---|---|
| 8,150,387 B2* | 4/2012 | Klein | H04M 1/72533 348/734 |
| 8,226,476 B2* | 7/2012 | Haltovsky | A63F 13/31 463/30 |
| 2005/0172234 A1* | 8/2005 | Chuchla | H04N 5/44591 715/735 |
| 2006/0120624 A1* | 6/2006 | Jojic | G06F 17/30843 382/284 |
| 2009/0094654 A1* | 4/2009 | Sullivan | H04N 7/163 725/110 |
| 2010/0259464 A1* | 10/2010 | Chang | G06F 3/1454 345/2.3 |
| 2010/0259491 A1 | 10/2010 | Rajamani et al. | |
| 2011/0054641 A1* | 3/2011 | Hur | G08C 17/00 700/20 |
| 2011/0252317 A1 | 10/2011 | Keranen et al. | |
| 2011/0265120 A1* | 10/2011 | Vaysman | H04N 5/44543 725/39 |
| 2011/0304583 A1* | 12/2011 | Kruglick | G06F 3/044 345/174 |
| 2012/0274547 A1* | 11/2012 | Raeber | G06F 17/30011 345/156 |
| 2013/0159565 A1* | 6/2013 | Soyannwo | G06F 9/4445 710/33 |
| 2014/0002399 A1* | 1/2014 | Kambhatla | G06F 3/0412 345/173 |
| 2014/0157339 A1* | 6/2014 | Zhang | H04N 21/4126 725/110 |
| 2014/0289757 A1* | 9/2014 | Haeuser | H04N 21/43615 725/30 |
| 2015/0256594 A1* | 9/2015 | Nancke-Krogh | G06F 9/4843 709/204 |

FOREIGN PATENT DOCUMENTS

| | | | | |
|---|---|---|---|---|
| CN | 102395012 A | 3/2012 | | |
| CN | EP 2472997 A1 * | 7/2012 | ......... | G06F 3/03547 |
| EP | 1871075 A1 | 12/2007 | | |
| EP | 2242240 A1 | 10/2010 | | |

* cited by examiner

```
After detecting that N HDMI devices are
inserted or receiving an instruction, the
mobile terminal requests the HDMI device      ⟋ 401
for obtaining a right of controlling the
touch screen of the HDMI device
```
↓
```
After receiving a permission response
message of the HDMI device, the mobile
terminal performs a control operation         ⟋ 402
on the touch screen of the corresponding
HDMI device
```

METHOD FOR CONTROLLING TOUCH SCREEN, AND MOBILE TERMINAL

TECHNICAL FIELD

The present document relates to the mobile terminal, and particularly, to a method for controlling touch screens and a mobile terminal.

BACKGROUND

The 3rd Generation mobile communications (3G) intelligent mobile terminal High Definition Multimedia Interface (HDMI) and the Long Time Evolution (LTE, standard 4G mobile communications) intelligent mobile terminal HDMI are more and more widely used. Through the HDMI, it enables HDMI media player devices connected to the mobile terminal (i.e. high-definition televisions, projectors and digital media players, etc. with the HDMI) to intactly play media format information that is not supported by the numerous HDMI media player devices in the mobile terminal without decompression. Especially in a development tendency of the "cloud" terminal, terminal video media resources acquired by the users on demand and in an easily extensible way through the network are increasingly rich, and playing on the HDMI devices such as the high-definition televisions, etc. via the HDMI also becomes more extensive applications and demands.

In addition, another Mobile High-definition Link (MHL) interface (an interface developed by the Silicon Image company) compatible with a Universal Serial Bus (USB) interface structure can be used for the mobile terminal transmitting HDMI signals to the HDMI media player devices such as the high-definition televisions, etc. After the HDMI signals from the mobile terminal are converted into MHL signals and output via the MHL interface, the MHL signals are reconverted into the HDMI signals through an adapter of the transmission channel and transmitted to the HDMI media player devices such as the high-definition televisions, etc. However, either through the HDMI or the MHL interface, when video information of the mobile terminal is played on the HDMI media player devices such as the high-definition televisions, etc. at present, a manipulation interface of the user is still only limited to a terminal interface, and such manipulation is basically implemented by the user performing touch control on a touch screen of the mobile terminal.

The HDMI media player devices and HDMI devices in a broader range (i.e. devices with the HDMI, particularly referring to peripherals relative to the mobile terminal in the descriptions of the present document, not only including media player devices, but also including media acquisition devices such as video cameras and digital cameras with the HDMI) are all developing to the direction of intelligence at present, human-computer interface touch is also an increasingly apparent tendency, and touch screens have been widely used in many application scenarios at present. For the HDMI device with the touch screen, when media information of the mobile terminal interacts with the HDMI device via the HDMI, the user can only perform manipulation through the touch screen of the mobile phone, and the way of user experience is comparatively simplex.

SUMMARY

The technical problem required to be solved by the example of the present document is to provide a method for controlling touch screens and a mobile terminal, to control the touch screens of the HDMI devices.

In order to solve the above technical problem, the example of the present document provides a method for controlling touch screens, which comprises:

a mobile terminal, connected with an HDMI device, requesting the HDMI device for obtaining a right of controlling a touch screen of the HDMI device; and after receiving a permission response message of the HDMI device, the mobile terminal performing a control operation on the touch screen of the HDMI device.

Alternatively, the mobile terminal is connected with N HDMI devices, and N is equal to or greater than 1;

after detecting that N High Definition Multimedia Interface (HDMI) devices are inserted or receiving an instruction, the mobile terminal requests the HDMI device for obtaining the right of controlling the touch screen of the HDMI device; and the touch screen of the HDMI device is associated with a display screen of the HDMI device.

Alternatively, the mobile terminal performing the control operation on the touch screen of the HDMI device comprises:

the mobile terminal establishing a handshake with the touch screen of the HDMI device, traversing drive information of the touch screen of the HDMI device, if confirming that the touch screen of the HDMI device is available, responding to a touch interruption message of the touch screen of the HDMI device; and if conforming that the touch screen of the HDMI device is unavailable, controlling the HDMI device to give prompt information on a display screen of the HDMI device through a display data channel.

Alternatively, the mobile terminal performing the control operation on the touch screen of the HDMI device further comprises:

after receiving a first user touch message, providing a touch screen validity selection menu on a display interface; and after receiving a selection message of a user, controlling a touch screen of the mobile terminal and one or multiple touch screens selected as valid touch screens in the touch screens of the HDMI devices to keep in an activated state according to the selection message, and making other touch screens enter a dormant state.

Alternatively, the above method further comprises:

after receiving a second user touch message, if determining that a touch screen touched by the user is in the dormant state, prompting a touch screen currently in the activated state in the other touch screens, or prompting that a current touch screen is in the dormant state and whether to activate the current touch screen.

Alternatively, the touch screen of the mobile terminal is associated with a display screen of the mobile terminal, the display screen of the mobile terminal comprises one primary display area and N non-primary display areas, the primary display area is used for displaying contents currently displayed by the present mobile terminal, and the N non-primary display areas are used for respectively displaying contents currently displayed by the N HDMI devices;

the display screen of the HDMI device comprises one primary display area and N non-primary display areas, the primary display area is used for displaying contents currently displayed by the present HDMI device, and the N non-primary display areas are used for respectively displaying contents currently displayed by other N−1 HDMI devices and the mobile terminal;

the mobile terminal performing the control operation on the touch screen of the HDMI device comprises:

the mobile terminal detecting a user touch event of each touch screen by turns in a preset order; and judging whether the user touch event is associated with the primary display area, if yes, responding to a touch control of the user on the currently displayed contents; and if no, switching contents displayed by the primary display area in a displayed screen associated with a touch screen corresponding to the user touch event to contents displayed by the non-primary display areas, and switching the contents displayed in the non-primary display areas to the contents displayed in the primary display area.

Alternatively, the mobile terminal performs the control operation on the touch screen of the HDMI device through an HDMI or a mobile high-definition link interface.

Alternatively, the HDMI devices include high-definition televisions.

The example of the present document further provides a mobile terminal, which comprises:

a first module, configured to: request a HDMI device connected with the mobile terminal for obtaining a right of controlling a touch screen of the HDMI device; and a second module, configured to: after receiving a permission response message of the HDMI device, perform a control operation on the touch screen of the HDMI device.

Alternatively, the first module is configured to: the first module is configured to: after detecting that N High Definition Multimedia Interface (HDMI) devices are inserted or receiving an instruction, request the HDMI device for obtaining the right of controlling the touch screen of the HDMI device, wherein N is equal to or greater than 1.

Alternatively, the second module comprises:

a first unit, configured to: establish a handshake with the touch screen of the HDMI device, traverse drive information of the touch screen of the HDMI device, if confirming that the touch screen of the HDMI device is available, respond to a touch interruption message of the touch screen of the HDMI device; and if conforming that the touch screen of the HDMI device is unavailable, control the HDMI device to give prompt information on a display screen of the HDMI device through a display data channel.

Alternatively, the second module further comprises:

a second unit, configured to: after receiving a first user touch message, provide a touch screen validity selection menu on a display interface; and a third unit, configured to: after receiving a selection message of a user, control a touch screen of the mobile terminal and one or multiple touch screens selected as valid touch screens in the touch screens of the HDMI devices to keep in an activated state according to the selection message, and make other touch screens enter a dormant state.

Alternatively, the second module further comprises:

a fourth unit, configured to: after receiving a second user touch message, if determining that a touch screen touched by the user is in the dormant state, prompt a touch screen currently in the activated state in the other touch screens, or prompt that a current touch screen is in the dormant state and whether to activate the current touch screen.

Alternatively, the touch screen of the mobile terminal is associated with a display screen of the mobile terminal, the display screen of the mobile terminal comprises one primary display area and N non-primary display areas, the primary display area is used for displaying contents currently displayed by the present mobile terminal, and the N non-primary display areas are used for respectively displaying contents currently displayed by the N HDMI devices;

the display screen of the HDMI device comprises one primary display area and N non-primary display areas, the primary display area is used for displaying contents currently displayed by the present HDMI device, and the N non-primary display areas are used for respectively displaying contents currently displayed by other N−1 HDMI devices and the mobile terminal;

the second module further comprises:

a fifth unit, configured to: detect a user touch event of each touch screen by turns in a preset order; and a sixth unit, configured to: judge whether the user touch event is associated with the primary display area, if yes, respond to a touch control of the user on the currently displayed contents; and if no, switch contents displayed by the primary display area in a display screen associated with a touch screen corresponding to the user touch event to contents displayed by the non-primary display areas, and switch the contents displayed by the non-primary display areas to the contents displayed by the primary display area.

Alternatively, the second module performs the control operation on the touch screen of the corresponding HDMI device through an HDMI or a mobile high-definition link interface.

Alternatively, the HDMI devices include high-definition televisions.

In conclusion, the example of the present document provides a method for controlling touch screens and a mobile terminal, which can control the touch screens of the HDMI devices.

PREFERRED EMBODIMENTS OF THE PRESENT INVENTION

The examples of the present document will be described in detail in combination with the accompanying drawings below. It should be noted that the examples in the present document and the characteristics in the examples can be optionally combined with each other in the condition of no conflict.

Figure 1:
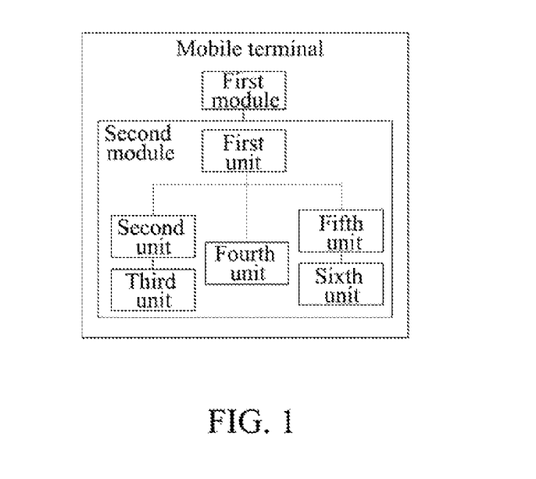
FIG. 1 is a schematic diagram of a mobile terminal according to the example of the present document.

FIG. 1 is a schematic diagram of a mobile terminal according to the example of the present document, and as shown in FIG. 1, the mobile terminal of the example includes:

a first module, configured to: after detecting that N High Definition Multimedia Interface (HDMI) devices are inserted or receiving an instruction of a host processor, request the HDMI device for obtaining a right of controlling a touch screen of the HDMI device, wherein the touch screen of the HDMI device is associated with a corresponding display screen, and N is equal to or greater than 1; and a second module, configured to: after receiving a permission response message of the HDMI device, perform a control operation on the touch screen of the corresponding HDMI device.

Wherein, the second module can include:

a first unit, configured to: establish a handshake with the touch screen of the HDMI device, traverse drive information of the touch screen of the HDMI device, if confirming that the touch screen of the HDMI device is available, respond to a touch interruption message of the touch screen of the HDMI device; and if conforming that the touch screen of the HDMI device is unavailable, control the HDMI device to give prompt information on the display screen of the HDMI device through a display data channel;

a second unit, configured to: after receiving a first user touch message, provide a touch screen validity selection menu on a display interface;

a third unit, configured to: after receiving a selection message of the user, control a touch screen of the mobile terminal and one or multiple touch screens selected as valid touch screens in the touch screens of the HDMI devices to keep an activated state according to the selection message, and make other touch screens enter a dormant state; and a fourth unit, configured to: after receiving a second user touch message, if determining that a touch screen touched by the user is in the dormant state, prompt a touch screen currently in the activated state in the other touch screens, or prompt that a current touch screen is in the dormant state and whether to activate the current touch screen.

In one preferred example, a touch screen of the mobile terminal is associated with a corresponding display screen, the display screen of the mobile terminal includes one primary display area and N non-primary display areas, the primary display area is used for displaying contents currently displayed by the present mobile terminal, and the N non-primary display areas are used for respectively displaying contents currently displayed by the N HDMI devices;

the display screen of the HDMI device includes one primary display area and N non-primary display areas, the primary display area is used for displaying contents currently displayed by the present HDMI device, and the N non-primary display areas are used for respectively displaying contents currently displayed by other N−1 HDMI devices and the mobile terminal;

the second module can also include:

a fifth unit, configured to: detect a user touch event of each touch screen by turns in a preset order; and a sixth unit, configured to: judge whether the user touch event is associated with the primary display area, if yes, respond to a touch control of the user on the currently displayed contents; and if no, switch contents displayed by the primary display area in a display screen associated with a touch screen corresponding to the user touch event to contents displayed by the non-primary display areas, and switch the contents displayed by the non-primary display areas to the contents displayed by the primary display area.

Wherein, the second module performs the control operation on the touch screen of the corresponding HDMI device through an HDMI or a mobile high-definition link interface.

Control operations on the touch screen of the mobile terminal and the touch screen of the high-definition television are mainly implemented in a condition of the existing HDMI or MHL interface in the example of the present document. The apparatus of the example of the present document introduces control signals of the touch screen of the high-definition television into specific signals of the HDMI or MHL interface, which implements that the mobile terminal can control the touch screen of the high-definition television. Descriptions will be made in combination with two examples below.

Example 1

Figure 2:
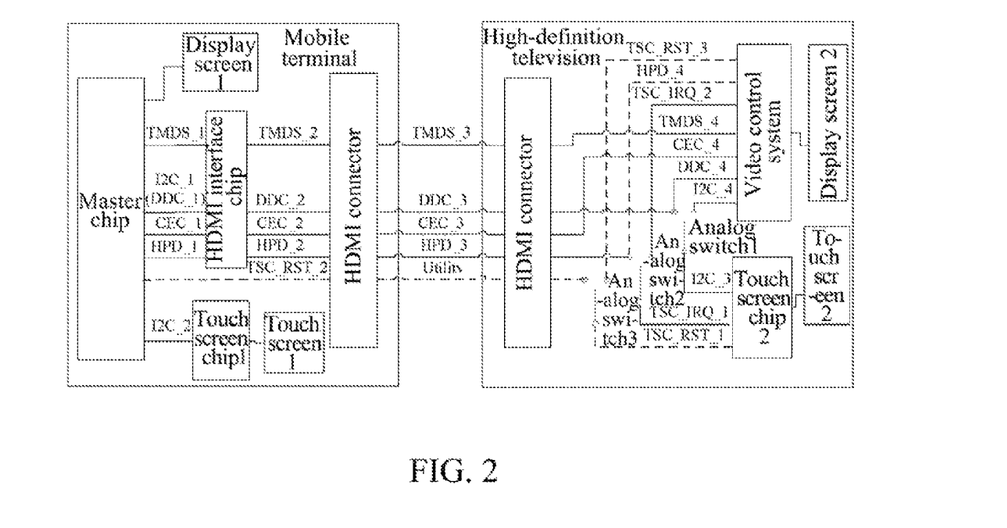
FIG. 2 is a schematic apparatus diagram of a mobile terminal controlling the touch screen of the high-definition television through an HDMI according to the example 1 of the present document.

As shown in FIG. 2, in the example, the control signals of the touch screen of the high-definition television are introduced into specific signals of the HDMI. Each of the mobile terminal and the high-definition television has its respective display screen and touch screen associated with its respective display screen. The mobile terminal and the high-definition television are connected via the HDMI, and an HDMI chip added between a master chip of the mobile terminal and an HDMI connector of the mobile terminal is used for processing electrical level match and Electro-Static Discharge (ESD) and so on.

Inter-Integrated Circuits (I2C, two-line serial bus developed by the PHILIPS company and used for connecting a microcontroller and its peripheral devices, and according to different positions, respectively defined as an I2C_1, an I2C_2, an I2C_3 and an I2C_4) of the master chip of the mobile terminal are connected with Display Data Channels (DDC) of the HDMI, and according to different positions, the DDC are respectively defined as a DDC_1, a DDC_2, a DDC_3 and a DDC_4, which are used for processing protection of related contents and data transmission of television definition.

Both the DDC and the I2C consist of two signal lines namely a clock line and a data line, in FIG. 1, the I2C_1 is labeled with the DDC_1 in parentheses at the same time, but only work modes are similar between the I2C_1 and the DDC_1, and the two have difference exists between the two in the protocol. Since the I2C of the mobile terminal can be externally connected to peripherals with various different I2C addresses, once the I2C of the touch screen of the high-definition television can be connected to this signal channel, it can implement that the mobile terminal controls the touch screen of the high-definition television. However, such connection cannot always exist, when the high-definition television itself needs to control the touch screen of the high-definition television, the mobile terminal is required to disconnect such connection. Therefore, the I2C_3 of the touch screen of the high-definition television as a common terminal is externally connected to an analog switch 1 so as to perform handover back and forth between the I2C_4 of the video control system and the DDC_4 that can be connected to the mobile terminal. When the mobile terminal controls the touch screen of the high-definition television, the analog switch 1 switches to the DDC_4, the I2C_3 and the DDC_4 are connected (a default state is that the television controls its own touch screen, the analog switch 1 switches to the I2C_4, the I2C_3 and the I2C_4 are connected).

Hot Plug Detection (HPD) signals are respectively defined as an HPD_1, an HPD_2, an HPD_3 and an HPD_4 according to different positions, which are used for starting a connection between HDMI meeting points (i.e. emitters, such as digital televisions or projectors) and mobile devices.

For detection is only carried out when the devices are plugged and no detection is carried out in the rest of the time, the HPD can be more fully utilized, which makes the HPD be used for a handshaking signal channel during the normal communication after the mobile terminal and the high-definition television hardware are connected.

In the example, interrupt signals TSC_IRQ of the touch screen of the high-definition television (a common terminal of an analog switch 2 is the TSC_IRQ_1 of the touch screen, and it switches to the TSC_IRQ_2 of the video control system by default) are connected to the HPD, thus the ever-present touch interrupt signals TSC_IRQ of the touch screen of the high-definition television can be transmitted to the master chip of the mobile terminal via the channel.

However, when the HPD is used simultaneously for plug detection and touch interruption, it is required to strictly distinguish the identification electrical levels of the plug detection and the touch interruption, otherwise false triggering will be easily caused. Therefore, a more ideal scheme is to implement an original plug detection function of the HPD in other ways (e.g., detection is carried out through the electrical level fluctuation of a certain data signal channel of the TMDS), and the signal channel is solely used for the touch interruption. Though the HPD of the high-definition television terminal is connected with the video control system, it can swiftly switch to control the analog switch to be externally controlled when the interface devices are plugged, but the same object can be achieved by the mobile terminal sending a request for changing the touch screen of the high-definition television to be controlled by the mobile terminal to the video control system via the DDC, and a blind handover can be avoided in the condition that the video control system does not know the external control. Therefore, the HPD_4 in the figure is represented by a dash line, and it is not recommended that the HPD is connected to the video control system under normal circumstances.

A standard HDMI connector generally has 19 pins, besides the above control signals, it also has: Consumer Electronics Control (CEC, used for a remote controller controlling multiple high-definition video devices supporting the CEC) signals, total 4 pairs of Transition Minimized Differential Signaling (TMDS) audio and video data signals occupying 8 signal lines, power and ground (not shown in FIG. 1), and a signal pin with reserved functions. The signal pin with reserved functions is named Utility, it is revised that this pin and the HPD pins can be used for HDMI Ethernet and Audio return Channel (HEAC) differential pairs in the HDMI 1.4 specification. But conventional applications of the mobile terminal will not relate to the HEAC at present.

Therefore, besides that the HPD can be used for transmitting the touch interrupt signals TSC_IRQ, the Utility can also be used for transmitting reset control information possessed by certain touch screen chips (TSC_RST, TSC_RST_1, TSC_RST_2 and TSC_RST_3 are respectively identified according to different positions in FIG. 1), and it is required to add an analog switch 3 used for performing touch screen reset signal handover (represented by the dash line in FIG. 1) between the master chip of the mobile terminal and the video control system of the high-definition television in this case.

Certainly, configurations of the two signal channels namely the HPD and the Utility can also be exchanged, that is, the HPD is used for transmitting the TSC_RST, and the Utility is used for transmitting the TSC_IRQ.

For the mobile terminal, once two signal lines of the I2C and one signal line of the TSC_IRQ of the touch screen of the high-definition television are connected to the master chip of the system, it can implement a communication control on the touch screen of the high-definition television (power support for a normal operation of the touch screen is provided by the high-definition television). Certainly, the touch screen chip associated with the touch screen and the master chip usually have only 3 signal lines, but there actually exist more signal line connections between the touch screen and the touch screen chip, such as reading by X and Y coordinates and more control signal lines. If a situation of unmatched electrical levels exists in the above signal lines, a level translator can be added.

Besides the above I2C, TSC_IRQ and TSC_RST handshaking signals, normal operations of the touch screen and display screen of the high-definition television under the control of the mobile terminal still need the power supply provided by the high-definition television, and the content display needs a DDC handshaking control between the master chip of the mobile terminal and the video control system of the high-definition television.

Example 2

Figure 3:
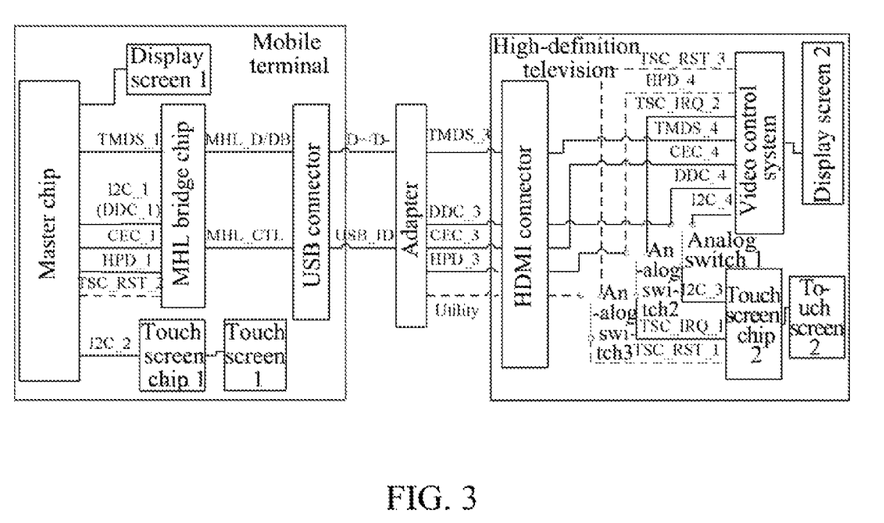
FIG. 3 is a schematic apparatus diagram of a mobile terminal controlling the touch screen of the high-definition television through an MHL interface according to the example 2 of the present document.

The situation of the MHL interface is described based on FIG. 2 in FIG. 3. A physical structure of an MHL interface connector is a USB connector, the mobile terminal and the high-definition television are connected via the MHL interface, on the one hand, it is required to add an MHL bridge chip between a master chip of the mobile terminal and the USB connector so as to convert HDMI signals of the master chip into MHL signals, on the other hand, it is required to add an adapter between the USB connector of the mobile terminal and an HDMI connector of the high-definition television so as to reconvert the MHL signals into the HDMI signals. An advantage of the mobile terminal using the MHL interface is reducing an external interface.

A standard HDMI connector generally has 19 pins, but the USB connector only has 5 pins, in the conversion between the HDMI signals and the MHL signals executed by the bridge chip, it mainly transmits the 4 pairs of TMDS audio and video data signals occupying 8 signal lines of the HDMI by only using two signal lines D+/D− of the USB, the rest control signals including DDC signals, Consumer Electronics Control (CEC) signals and HPD signals are all transmitted by only using the USB ID signal line. When the Utility is used for the control signals, it is also required to transmit the control information via the USB ID signal line.

In FIG. 2, MHL_D/DB is used to represent two data signal lines between the MHL bridge chip and the USB connector, and MHL_CTL represents one control line. Undoubtedly, a data rate in the USB signal channel is required to be several times higher than a data rate in the HDMI signal channel, otherwise such conversion cannot be completed. For example, a TMDS data rate of the HDMI can reach 1.65 Gbps, thus the USB at least needs a rate of more than 4 times. Therefore, the system design has higher requirements on impedance matching of the USB signals and signal shielding and so on.

In the situation of the MHL interface, the mobile terminal detects the peripheral plug detection through a USB D+/D− level fluctuation, it goes through the USB ID channel when a touch interruption occurs, thus a condition that false triggering may occur when the HPD and the touch interrupt function are used simultaneously in the situation of the HDMI will not appear.

It can be seen from FIG. 2 and FIG. 3 that, in the two situations of the HDMI and the MHL interface, by using the signal lines of the existing interfaces, it can conveniently implement that the mobile terminal controls the touch screen of the high-definition television, it is equivalent to that two touch screens with different addresses are hanged on the same I2C of the master chip of the mobile terminal, it can easily perform independent control and response on different touch screens, thus it can also implement free handover between the touch screens.

Figure 4:
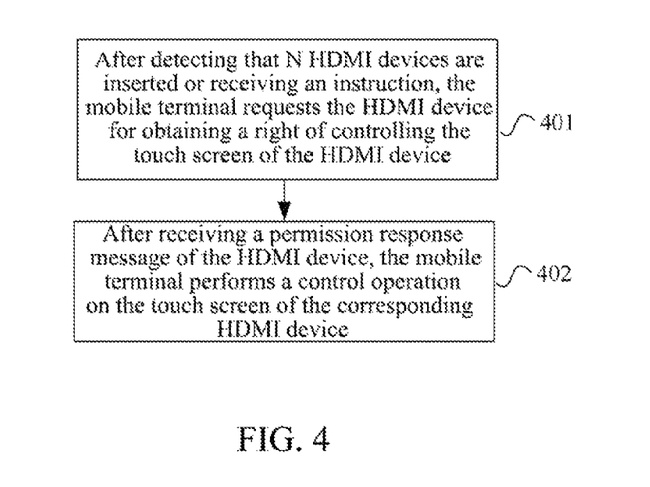
FIG. 4 is a flow diagram of a method for controlling touch screens according to the example of the present document.

FIG. 4 is a flow diagram of a method for controlling touch screens according to the example of the present document, and as shown in FIG. 4, the method of the example includes the following steps.

In step 401, after detecting that N HDMI devices are inserted or receiving an instruction, the mobile terminal requests the HDMI device for obtaining a right of controlling the touch screen of the HDMI device, wherein the touch screen of the HDMI device is associated with a corresponding display screen, and N is equal to or greater than 1.

In step 402, after receiving a permission response message of the HDMI device, the mobile terminal performs a control operation on the touch screen of the corresponding HDMI device.

Figure 5:
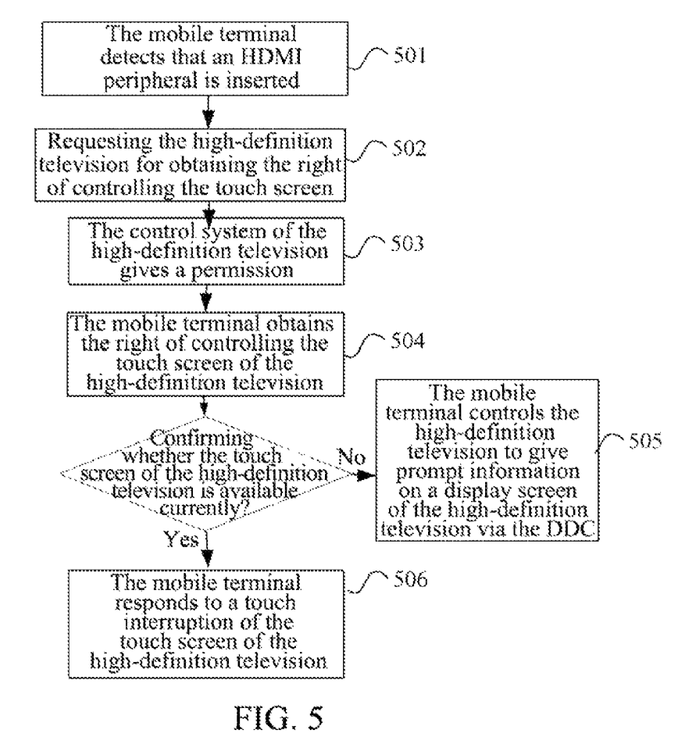
FIG. 5 is a flow diagram of a method for the mobile terminal controlling the touch screen of the high-definition television according to the example of the present document.

Descriptions will be made in combination with an example of the mobile terminal controlling the touch screen of the high-definition television after the mobile terminal and the high-definition television are physically connected via the HDMI or the MHL interface below, and as shown in FIG. 5, the following steps are included.

In step 501, the mobile terminal confirms that an external HDMI device is inserted through a data line level detection or an HPD signal line level detection, and loads drive information of the associated peripherals.

The HDMI devices of the example particularly refer to peripherals relative to the terminal, they do not contain the terminal itself with the HDMI, they can be HDMI media player devices (such as the high-definition televisions, projectors and digital media players, etc. with the HDMI), and they can also be HDMI data acquisition devices (such as video cameras and digital cameras, etc. with the HDMI).

In step 502, the master chip of the mobile terminal communicates with the video control system of the high-definition television through a DDC signal line, and requests the video control system of the high-definition television for obtaining the right of controlling the touch screen of the high-definition television.

In step 503, the control system of the high-definition television gives a permission, controls the analog switch to switch the touch screen I2C and the touch interrupt signal to be respectively connected to the DDC signal line and the HPD signal line, and gives up the right of controlling the touch screen of the high-definition television.

In step 504, the mobile terminal obtains the right of controlling the touch screen of the high-definition television, and establishes a handshake with the touch screen of the high-definition television via the I2C, the mobile terminal initializes and traverses drive information of the touch screen of the television in the system by reading and writing I2C addresses and devices, confirms whether the touch screen of the high-definition television is available currently, if unavailable, enters step 505, and if available, enters step 506.

In step 505, the mobile terminal controls the high-definition television to give prompt information on a display screen of the high-definition television via the DDC, so as to indicate that the touch screen of the television is unavailable currently.

In step 506, the mobile terminal responds to a touch interruption of the touch screen of the high-definition television, and performs control on the contents displayed by the display screen of the television via the DDC according to coordinate information provided by the touch interruption and so on.

In the above flow, except that the step 503 is executed on the high-definition television, the rest of the steps are executed on the mobile terminal.

Through the above flow, the user can implement a control on the user interface of the mobile terminal through an operation on the touch screen of the television.

Based on the above implementation of the mobile terminal controlling the touch screen of the television, and according to the capacity of the mobile terminal supporting the aspect of display contents associated with the dual display screens, processing on the aspect of display contents can be further performed.

Figure 6:
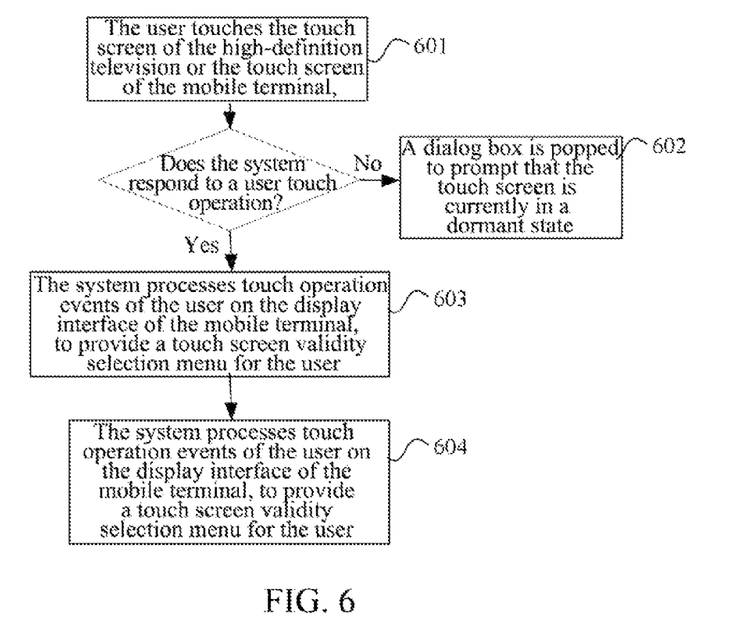
FIG. 6 is a flow diagram of a method for the mobile terminal controlling different screens to display the same content according to the example of the present document.

With regard to a situation that the mobile terminal controls dual display screens to be able to only display the same content, as shown in FIG. 6, the following steps are included.

In step 601, the user touches the touch screen of the high-definition television or the touch screen of the mobile terminal, if the system responds to a user touch operation, enters step 603; and if the system does not respond to a user touch operation, enters step 602.

In step 602, a dialog box is popped to prompt that the current touch screen is in a dormant state and to prompt a touch screen currently in an activated state, the user is required to perform operation on the touch screen currently in the activated state, and the current touch screen can be activated when the operation is performed on the touch screen.

In step 603, the system processes touch operation events of the user on the display interface of the mobile terminal, a dialog box popped from a minimized icon of the specific area of the display interface or a dialog box on the direct interface is shown to provide a touch screen validity selection menu for the user, and the user selects whether the touch screen of the mobile terminal or the touch screen of the television is valid according to the touch screen validity selection menu.

In step 604, it carries on the step 603, the system determines whether a specific touch screen enters the dormant state or keeps in the activated state according to a selection of the user on the touch screen validity.

In the above flow, the system can limit that only one touch screen is valid at any time, so as to avoid a possible background processing disorder of common display contents caused by a concurrent operation on different touch screens.

Figure 7:
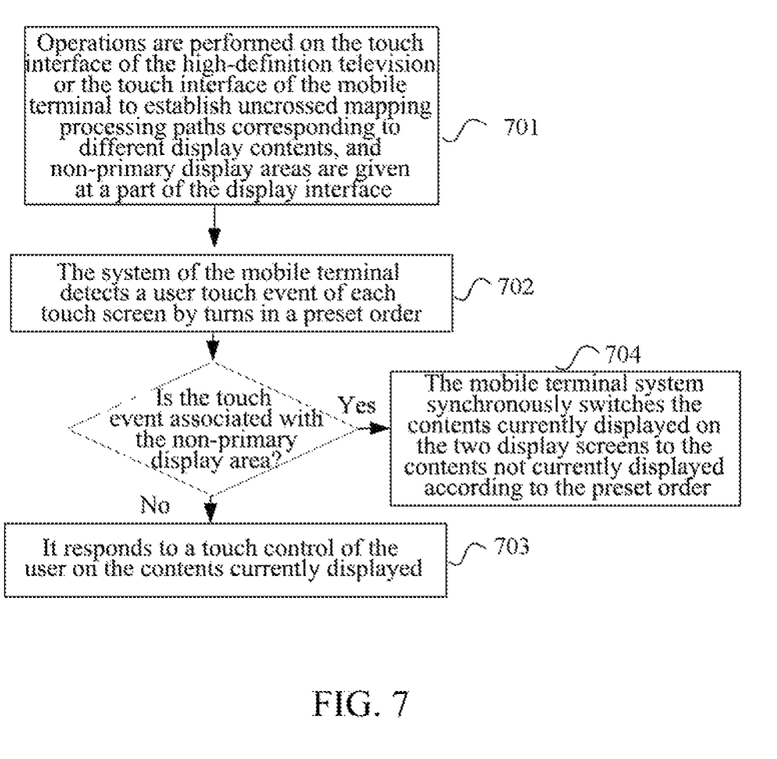
FIG. 7 is a flow diagram of a method for the mobile terminal controlling dual screens to display different contents according to the example of the present document.

With regard to a situation that the mobile terminal controls dual display screens to be able to display different contents, as shown in FIG. 7, the following steps can be included.

In step 701, uncrossed mapping processing paths corresponding to different display contents are established for operations performed on the touch interface of the high-definition television or the touch interface of the mobile terminal, and non-primary display areas are given at a part of the display interface.

For example, a minimized icon, a dialog box or "picture in picture" to represent contents that are not currently displayed (a small area is drawn from a specific display screen to give a synchronous display of the contents of the non-self display screen, that is, a small area is drawn from the display interface of the high-definition television for displaying the contents displayed on the interface of the mobile terminal, and a small area is similarly drawn from the mobile terminal for displaying the contents displayed on the high-definition television).

Wherein, the high-definition television is taken as an example, the contents displayed by the mainbody of the current display interface are the contents currently displayed, and the contents which the mobile terminal is displaying displayed by the part of the display interface, which are the contents not currently displayed, vice versa.

Certainly, whether the high-definition television or the mobile terminal, if the current display interface of the high-definition television or the mobile terminal is divided into two areas with the same size to display different contents, the system can randomly specify contents displayed by a certain display area as the contents currently displayed (that is, the contents currently displayed by the present device or the terminal are displayed), and the contents displayed by the other display area are the contents not currently displayed at this point.

In step 702, the mobile terminal detects a user touch event of each touch screen by turns in a preset order: if the touch event is associated with the non-primary display areas such as a minimized icon, a dialog box or "picture in picture" of contents that are not currently displayed, enters step 704; otherwise, enters step 703.

In step 703, it responds to a touch control of the user on the contents currently displayed.

In step 704, the mobile terminal system synchronously switches the contents currently displayed on the two display screens to the contents not currently displayed according to the preset order.

For example, after touching a small area on the high-definition television or the mobile terminal, the touch event is reported to a processor of a wireless terminal, the processor judges whether the touch event is a touch event in the area of contents currently displayed or a touch event in the area of contents not currently displayed according to touch coordinate sources, if the touch event is the touch event in the area of contents currently displayed, turns to step 703, and responds to certain submenu operations in the contents currently displayed, otherwise performs series of information processing (compression, recalculation of display coordinates and decompression, etc.) on the contents displayed in different display areas and then exchanges the contents to be displayed, and turns to step 704.

For a special situation of two display areas with the same size, it can randomly specify the contents displayed by a certain display area as the contents currently displayed within the processor, the touch events to the contents currently displayed are responded to the submenu; and the touch events to the contents not currently displayed are responded as displayed contents switching.

The above flow actually guarantees that the displayed contents of all the display screens are different at any time.

If the mobile terminal user requests for quitting the control on the touch screen of the television no matter on which touch screen operation interface, the master chip sends an order to the video control system of the high-definition television via the DDC signal line after responding to such touch information, the video control system will switch the analog switch and disconnect an I2C connection relationship between the mobile terminal and the television touch screen, and the mobile terminal naturally gives up the right of controlling the television touch screen.

Since the I2C of the mobile terminal can be connected with multiple peripherals, extension can be performed on the aspects of apparatus with multiple screens and method on the aspects of HDMI interface control and display in the present document.

As shown in FIG. 2 or FIG. 3, on the one hand, the I2C_2 of the mobile terminal can be connected with more touch screens with different addresses; on the other hand, the I2C_1 of the mobile terminal can be connected with multiple touch screens of the high-definition television (such as dual screens in front and back, or one screen in front, or two screens on side, etc.) or touch screens of multiple high-definition televisions via the HDMI interface.

It is assumed that multiple touch screens correspond to multiple display screens and they respectively serve for two types of carriers: the high-definition television and the mobile terminal. Therefore, in the processing method, if N display screens can only correspond to the sane display content, when the flow of FIG. 6 is used, the touch screen in the activated state or dormant state prompted by the display interface to the user is not a single screen but a touch screen table column.

If the corresponding N display screens have N display contents, when the flow of FIG. 7 is used, a number of minimized icons of the contents not currently displayed, dialog boxes or "picture in picture" is represented as N−1, the rest of processing processes in the two situations are basically consistent with that of FIG. 6 and FIG. 7 respectively.

Moreover, if the mobile terminal is connected to control touch screens of N HDMI devices in the same time, it also can be that a plurality of corresponding display screens thereof display the same content, other display screens respectively display its own contents, the user can select the touch screen of the mobile terminal and one or multiple touch screens in the touch screens of the N HDMI devices to keep the activated state, and other touch screens enter the dormant state. All or part of the touch screens entering the dormant state can be associated with a touch screen in the activated state, thus, the display screens corresponding to the touch screens in the activated state that should be associated with these touch screens entering the dormant state can display the same content, the display screens corresponding to the other touch screens in the activated state can perform independent display, or the other touch screens in the activated state also can be associated with part of touch screens in the dormant state, and so forth.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

The above description is only the preferred examples of the present document. Certainly, the present document can still have other various examples. The skilled familiar to the art can make various corresponding changes and transformations according to the present document without departing from the spirit and essence of the present document, and these corresponding changes and transformations shall all fall into the protection scope of the appended claims of the present document.

INDUSTRIAL APPLICABILITY

The example of the present document provides a method for controlling touch screens and a mobile terminal, by which the touch screens of the HDMI devices can be controlled.

What is claimed is:

1. A method for controlling touch screens, comprising:
   detecting, by a mobile terminal, that N High Definition Multimedia Interface (HDMI) devices are connected with the mobile terminal;
   requesting, by the mobile terminal, each of the HDMI devices for obtaining a right of controlling a touch screen of each of the HDMI devices, wherein, N is an integer and is greater than 1, and the touch screen of each of the HDMI devices is associated with a display screen of the same HDMI device; and
   after receiving a permission response message of one or more of the HDMI devices, performing, by the mobile terminal, a control operation on the touch screen of each responding HDMI device;
   wherein, a touch screen of the mobile terminal is associated with a display screen of the mobile terminal, wherein the display screen of the mobile terminal comprises one primary display area and N non-primary display areas, the primary display area is used for displaying contents currently displayed by the present mobile terminal, and the N non-primary display areas are used for respectively displaying contents currently displayed by the N HDMI devices;
   wherein, the step of the mobile terminal performing the control operation on the touch screen of each responding HDMI device comprises:
   when detecting a user touch event on the touch screen of the HDMI device, transmitting, by the HDMI device, data on the touch screen of the HDMI device to the primary display area of the mobile terminal, and switching, by the mobile terminal, contents displayed by one of the non-primary display areas which displays contents of the current HDMI device on which the user touch event occurs to be displayed on the primary display area of the mobile terminal, and switching, by the mobile terminal, contents displayed by the primary display area of the mobile terminal to be displayed on said one of the non-primary display areas.

2. The method according to claim 1, wherein: performing, by the mobile terminal, the control operation on the touch screen of each responding HDMI device comprises:
   establishing, by the mobile terminal, a handshake with the touch screen of each responding HDMI device, traversing drive information of the touch screen of each responding HDMI device, if confirming that the touch screen of one responding HDMI device is available, responding to a touch interruption message of the touch screen of said one responding HDMI device; and if confirming that the touch screen of said one responding HDMI device is unavailable, controlling said one responding HDMI device to give prompt information on the display screen of said one responding HDMI device through a display data channel.

3. The method according to claim 2, wherein: performing, by the mobile terminal, the control operation on the touch screen of each responding HDMI device further comprises:
   after receiving a first user touch message, providing, by the mobile terminal, a touch screen validity selection menu on a display interface; and
   after receiving a selection message of a user, controlling, by the mobile terminal, the touch screen of the mobile terminal and one or multiple touch screens which are in the touch screens of the responding HDMI device and selected as valid touch screens to keep in an activated state according to the selection message, and making other touch screens enter a dormant state.

4. The method according to claim 3, further comprising:
   after receiving a second user touch message, if determining that a touch screen touched by the user is in the dormant state, prompting, by the mobile terminal, to the user a touch screen currently in the activated state in other activated touch screens, or prompting, by the mobile terminal, to the user that a current touch screen is in the dormant state and whether to activate the current touch screen.

5. The method according to claim 1, further comprising:
   performing, by the mobile terminal, the control operation on the touch screen of each responding HDMI device through an HDMI or a mobile high-definition link interface.

6. The method according to claim 1, wherein: the HDMI device includes a high-definition television.

7. The method according to claim 1, wherein: performing, by the mobile terminal, the control operation on the touch screen of each responding HDMI device comprises:
   when the response message indicates that a first analog switch connected to a I2C_3 pin on a touch screen chip of one HDMI device is switched to a Display Data Channel (DDC)_4 pin of a video control system of said one HDMI device, performing, by the mobile terminal, the control operation on the touch screen connected to the touch screen chip of said one HDMI device;
   when the response message indicates that the first analog switch is switched to a I2C_4 pin of the video control system of said one HDMI device, then the touch screen of said one HDMI device is not subject to the control of the mobile terminal but is controlled by said one HDMI device;
   wherein, Inter-Integrated Circuit (I2C) is two-line serial bus.

8. The method according to claim 1, wherein: performing, by the mobile terminal, the control operation on the touch screen of each responding HDMI device comprises:
   when the response message indicates that a second analog switch connected to a TSC_IRQ_1 pin on a touch screen chip of one HDMI device is switched from a TSC_IRQ_2 pin of a video control system of said one HDMI device to connect to Hot Plug Detection (HPD) to the mobile terminal, receiving, a master chip of the mobile terminal, ever-present touch interrupt signals of the touch screen of said one HDMI device via a channel.

9. The method according to claim 1, further comprising: performing, by a third analog switch, touch screen reset signal handover between a master chip of the mobile terminal and a video control system of one HDMI device.

10. A mobile terminal, comprising:
    a processor and a storage device, wherein the storage device stores processor-executable programs with following modules:
    a first module, configured to: detect that N High Definition Multimedia Interface (HDMI) devices are inserted into the mobile terminal or receive an instruction, request each of the HDMI devices connected with the mobile terminal for obtaining a right of controlling a touch screen of each of the HDMI devices, wherein, N is an integer and is greater than 1, and the touch screen of each of the HDMI devices is associated with a display screen of the same HDMI device; and a second module, configured to: after receiving a permission response message of one or more of the HDMI devices, perform a control operation on the touch screen of each responding HDMI device;

wherein, a touch screen of the mobile terminal is associated with a display screen of the mobile terminal, wherein the display screen of the mobile terminal comprises one primary display area and N non-primary display areas, the primary display area is used for displaying contents currently displayed by the present mobile terminal, and the N non-primary display areas are used for respectively displaying contents currently displayed by the N HDMI devices;

wherein, the second module is further configured to perform the control operation on the touch screen of each responding HDMI device by the following way:

when the HDMI device transmits data on the touch screen of the HDMI device to the primary display area of the mobile terminal after the HDMI device detects a user touch event on the touch screen of the HDMI device, switching contents displayed by one of the non-primary display areas of the mobile terminal which displays contents of the current HDMI device on which the user touch event occurs to be displayed on the primary display area of the mobile terminal, and switching contents displayed by the primary display area of the mobile terminal to be displayed on said one of the non-primary display areas of the mobile terminal.

11. The mobile terminal according to claim 10, wherein: the second module is further configured to:
establish a handshake with the touch screen of each responding HDMI device, traverse drive information of the touch screen of each responding HDMI device, if confirming that the touch screen of one responding HDMI device is available, respond to a touch interruption message of the touch screen of said one responding HDMI device; and if confirming that the touch screen of the HDMI device is unavailable, control said one responding HDMI device to give prompt information on the display screen of said one responding HDMI device through a display data channel.

12. The mobile terminal according to claim 11, wherein: the second module is further configured to:
after receiving a first user touch message, provide a touch screen validity selection menu on a display interface; and
after receiving a selection message of a user, control the touch screen of the mobile terminal and one or multiple touch screens which are in the touch screens of the responding HDMI device and selected as valid touch screens to keep in an activated state according to the selection message, and make other touch screens enter a dormant state.

13. The mobile terminal according to claim 12, wherein: the second module is further configured to:
after receiving a second user touch message, if determining that a touch screen touched by the user is in the dormant state, prompt to the user a touch screen currently in the activated state in other activated touch screens, or prompt to the user that a current touch screen is in the dormant state and whether to activate the current touch screen.

14. The mobile terminal according to claim 10, wherein: the second module performs the control operation on the touch screen of each responding HDMI device through an HDMI or a mobile high-definition link interface.

15. The mobile terminal according to claim 10, wherein: the HDMI device includes a high-definition television.

16. A High Definition Multimedia Interface (HDMI) device comprising:
a display screen and a touch screen associated with the display screen;
the display screen of said HDMI device comprises one primary display area and a plurality of non-primary display areas;
the primary display area is used for displaying contents currently displayed by said HDMI device, and the plurality of non-primary display areas are used for respectively displaying contents currently displayed by a mobile terminal that is connected with said HDMI device and a plurality of other HDMI devices that are connected with said HDMI device;
and
said HDMI device is configured to:
receive a request for obtaining a right of controlling the touch screen of the HDMI device from the mobile terminal, and send a permission response message of the HDMI device to the mobile terminal to enable the mobile terminal to perform a control operation on the touch screen of the HDMI device, wherein, a touch screen of the mobile terminal is associated with a display screen of the mobile terminal, the display screen of the mobile terminal comprises one primary display area and a plurality of non-primary display areas, the primary display area is used for displaying contents currently displayed by the present mobile terminal, and the plurality of non-primary display areas are used for respectively displaying contents currently displayed by the plurality of HDMI devices; and
the HDMI device is further configured to: if detecting a user touch event on the touch screen of the HDMI device, transmit data on the touch screen of the HDMI device to the primary display area of the mobile terminal to enable the mobile terminal to switch contents displayed by one of the non-primary display areas which displays contents of the current HDMI device on which the user touch event occurs to be displayed on the primary display area of the mobile terminal, and switch contents displayed by the primary display area of the mobile terminal to be displayed on said one of the non-primary display areas.

17. The HDMI device according to claim 16, further comprising a first analog switch connected to a I2C_3 pin on a touch screen chip of the HDMI device, and configured to switch between a Display Data Channel (DDC)_4 pin of a video control system of the HDMI device and a I2C_4 pin of the video control system of the HDMI device to make the HDMI device be controlled or be not controlled by the mobile terminal;
wherein, Inter-Integrated Circuit (I2C) is two-line serial bus.

18. The HDMI device according to claim 16, further comprising a second analog switch connected to a TSC_IRQ_1 pin on a touch screen chip of the HDMI device, and configured to switch from a TSC_IRQ_2 pin of a video control system of the HDMI device to connect to Hot Plug Detection (HPD) to the mobile terminal to make ever-present touch interrupt signals of the touch screen of the HDMI device be transmitted to a master chip of the mobile terminal via a channel.

19. The HDMI device according to claim 16, further comprising a third analog switch, wherein, a first end of the third analog switch is connected to a reset pin on a touch screen chip of the HDMI device, a second end of the third analog switch is connected to a reset pin on a video control system of the HDMI device, and a third end of the third analog switch is connected to a reset pin on a master chip of the mobile terminal, and     the third analog switch is configured to switch to connect the first end with the second end or connect the first end with the third end, so as to perform touch screen reset signal handover between the master chip of the mobile terminal and the video control system of the HDMI device.

* * * * *